United States Patent [19]

Attila

[11] Patent Number: 4,495,403
[45] Date of Patent: Jan. 22, 1985

[54] DIRECTLY-HEATED ELECTRICAL RESISTANCE UNSOLDERING TIP FOR SIMULTANEOUS LIQUEFYING AND REMOVING SOLDER FROM A JOINT

[76] Inventor: Toth Attila, Zechmeisterstrasse 15, A-4020 Linz, Austria

[21] Appl. No.: 531,426

[22] Filed: Sep. 12, 1983

[30] Foreign Application Priority Data

Sep. 13, 1982 [AT] Austria .................... 3425/82

[51] Int. Cl.³ .................... B23K 3/02; H05B 3/02
[52] U.S. Cl. .................... 219/233; 219/235; 228/19; 228/53
[58] Field of Search .............. 219/233, 235, 230, 229; 228/19, 20, 51-55

[56] References Cited

U.S. PATENT DOCUMENTS

| | | | |
|---|---|---|---|
| 2,012,938 | 9/1935 | Beuoy | 219/233 |
| 2,101,913 | 12/1937 | Meyer | 219/233 X |
| 2,405,866 | 8/1946 | Weller | 219/235 |
| 2,501,192 | 3/1950 | Scholler | 219/233 |
| 2,935,593 | 5/1960 | Fulmer | 219/233 |
| 3,316,384 | 4/1967 | Daniels | 219/235 |
| 3,821,513 | 6/1974 | Christensen | 219/233 |
| 3,881,087 | 4/1975 | Nicosia | 219/233 |
| 4,367,396 | 1/1983 | Ravinsky | 219/235 X |

FOREIGN PATENT DOCUMENTS

424218 8/1947 Italy .................... 219/235

*Primary Examiner*—A. Bartis
*Attorney, Agent, or Firm*—Salter & Michaelson

[57] ABSTRACT

An unsoldering tip for an electrical apparatus for unsoldering of soldering joints and for removing the solder consists of an electrical resistance wire being designed for being connected to an electrical voltage source at its both ends and becoming heated on current flow therethrough. The resistance wire comprises two legs which partially extend in parallel relation and have there a small distance between 0.1 and 0.3 mm. Both these legs are electrically connected one with the other at one end. At that area, where both these legs extend in parallel relation and with a small distance one from the other, a bend of about 180° is provided, where an enlargement of the small distance is provided to form an enlarged open area or arcuate configuration for receiving the joint to be unsoldered, with the maximum spacing between the legs in the enlarged area being between approximately 0.8 and 1.2 mm.

10 Claims, 4 Drawing Figures

DIRECTLY-HEATED ELECTRICAL RESISTANCE UNSOLDERING TIP FOR SIMULTANEOUS LIQUEFYING AND REMOVING SOLDER FROM A JOINT

BACKGROUND AND SUMMARY OF THE INVENTION

The present invention refers to an unsoldering tip for an electrical apparatus for unsoldering of soldering joints and for removing the solder.

There are already known electrical soldering irons, the unsoldering tip of which consists of an electrical conductor bent to a loop and connected to an electrical voltage source formed, for example, of the secondary winding of a transformer accommodated within the housing of the soldering iron. The electrical conductor has such an electrical resistance that the electrical conductor, on current flow, becomes heated to a temperature at which the solder is molten down.

When effecting repair work, for example on electrical equipment, there exists frequently the problem to unsolder defective soldering joints for removing defective components soldered to these soldering joints, so that these defective components can be removed and be substituted by operative components. In this case it is also necessary to remove the liquified solder to be in the position to perform a further soldering operation. With known soldering irons it is, however, not possible to remove the liquified solder.

Therefore, it has already been proposed to remove the solder liquified by a known soldering iron by means of a so-called tin-pump, but such procedure is complicated and can not be performed in all instances. In this case, the soldering iron must be held in one hand and the tin-pump used for removing the liquified solder must be held in the other hand, so that no hand is at disposal to seize other parts, for example to maintain in position a certain component or to remove the defective component.

It is an object of the invention to provide an unsoldering tip which simultaneously allows unsoldering of a soldering joint, i.e. liquification of the solder at the soldering joint, and removal of the liquified solder. It is a further object of the present invention to provide an unsoldering tip which can be inserted into a known soldering iron in place of a usual unsoldering tip. It is a further object of the invention to design this such that it can also be used at difficultly accessible soldering joints. Finally, it is an object of the invention to design the unsoldering tip such that it can be manufactured in a simple manner at low costs and that such a worn unsoldering tip can easily and without difficulties be replaced by a new unsoldering tip.

SHORT DESCRIPTION OF THE DRAWINGS

DETAILED DESCRIPTION OF THE DRAWINGS

Figure 1:
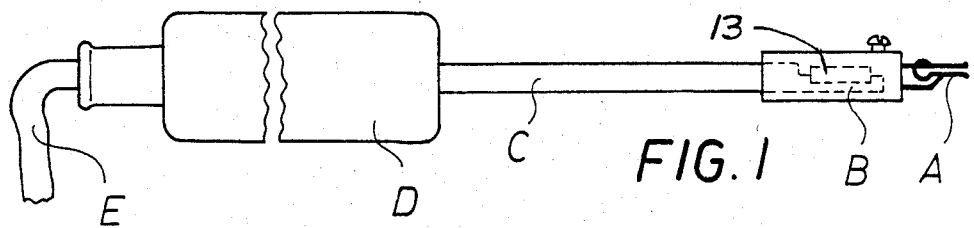
FIG. 1 shows a known soldering iron having connected thereto unsoldering tip according to the invention.

FIG. 1 shows a soldering iron of usual construction having placed in its pick-up member B the unsoldering tip A according to the invention. The pick-up member B is, via a tubular connecting member C, connected with a handle D into which is introduced a feed cable E.

Figure 2:
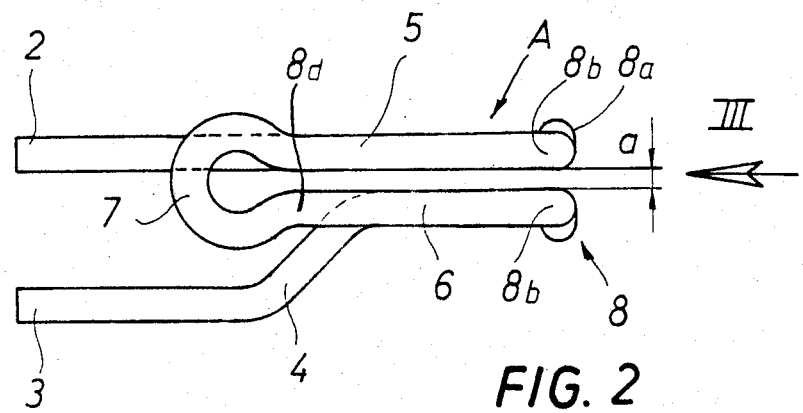
FIG. 2 shows an unsoldering tip according to the invention in an enlarged scale and in a side view in direction of the arrow II in FIG. 3.
Figure 3:
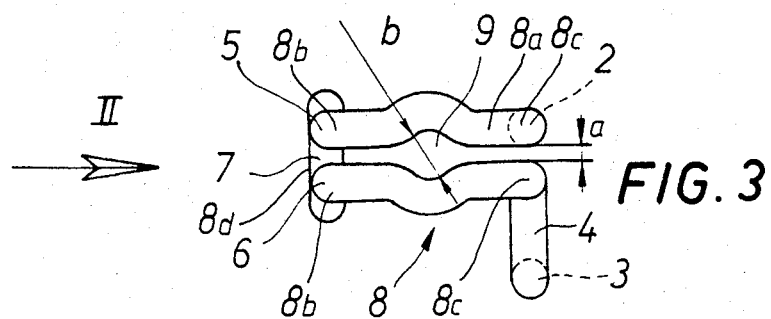
FIG. 3 shows a view of the unsoldering tip according to the invention in direction of the arrow III in FIG. 2.

The unsoldering tip A shown in a larger scale in the FIGS. 2 and 3 consists of an electric resistance wire, the free ends 2, 3 of which are inserted into correspondingly provided recesses within the pick-up member B and are thus connected with an electric voltage source. The distance of said both ends 2, 3 must thus be such that it corresponds to the distance of the respective recesses within the pick-up member B. This distance is, however, reduced along an angular portion 4 to a value a which is approximately 0.1 to 0.3 mm. At this location, both legs 5, 6 of the resistance wire extend in parallel relation and in close proximity and these legs are connected one with the other at 7. A bent portion 8 which includes a terminal facing portion 8a and bends 8b and 8c is defined by the legs 5 and 6 at the terminal end of the tip A. The legs 5 and 6 are preferably bent in the bent portion 8 by a total angle of approximately 180° so that they extend back toward the respective ends 2 and 3 thereof from the facing portion 8a, and cooperate to define a U-shaped portion 8d which includes the point 7 where the legs 5 and 6 are connected. At the area of the bent portion 8, the legs 5, 6 could also be bent for a smaller angle, but a bend for 180° is convenient because the space requirement of the unsoldering tip A is reduced and the working head A can also be used at difficulty accessible locations.

At the area of the facing portion 8a there is provided an enlarged open area or enlargement 9, where the spacing between the legs 5 and 6 is increased from the small distance a to an enlarged value b which is between 0.8 and 1.2 mm, preferably approximately 1 mm. This enlargement 9 serves the purpose of taking up the solder of the soldering joint to be unsoldered.

Figure 4:
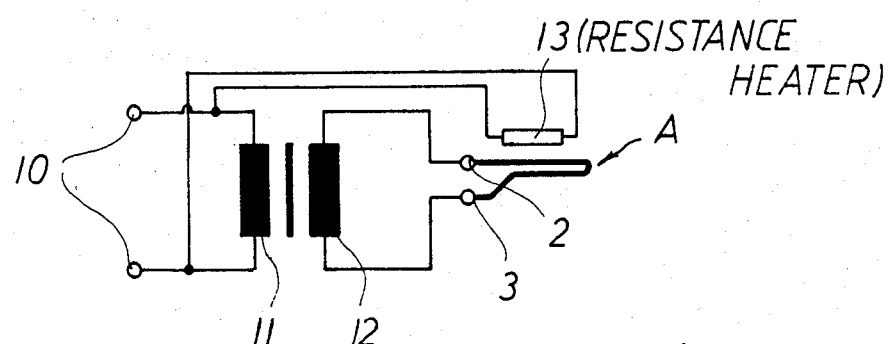
FIG. 4 shows an electrical circuit.

As is shown in FIG. 4, both ends 2, 3 of the unsoldering tip A are connected with the secondary winding 12, designed as a low voltage winding, of a transformer, the primary winding 11 of which is, via terminals 10, connected with the cable E. The transformer is, for example, accommodated within the handle D. Furthermore, a heater resistance 13 energized from the primary side of the transformer can be provided and be arranged within the pick-up member B, as illustrated, for providing heat therein.

If the primary winding 11 of the transformer is connected to the mains, a current of considerable amperage flows through the secondary winding 12 designed as a low voltage winding, so that the resistance wire is rapidly heated to a temperature effecting melting of the soldering joint. Simultaneously, an electrical field is generated by the current flowing through the resistance wire, said electrical field having, as tests have unambiguously shown, as a result that, if a soldering joint is introduced into the enlargement 9, the solder having been liquified on heating is flowing into the interstice of low dimensions between said both legs 5, 6 and in direction to the area of connection 7 and the solder becomes accumulated therein. If necessary, the solder can be thrown away by a short rocking movement of the apparatus being manually effected. During unsoldering operation, the liquid solder is thus transported away from the enlargement 9 in the desired manner and without additional measures, said transportation being effected on account of the fact that the current of high intensity flowing through the both legs 5, 6 of the resistance wire and having an only small distance one from the other generates an electrical field which exerts to the liquid solder a force in the sense of transporting away the solder from the enlargement 9 taking up the solder from the soldering joint.

What is claimed is:

1. An unsoldering tip for an electrical apparatus for unsoldering of soldering joints and for removing solder, comprising an electrical conductor having ends designed to be connected to an electric voltage source and having such an electrical resistance that it becomes heated on current flow therethrough, said electrical conductor comprising two legs partially extending in parallel relation and being connected one with the other at one end and being adapted for being connected at their other ends to respective terminals of the electrical voltage source and said legs having at their parallelly extending area a small distance of between approximately 0.1 and 0.3 mm. therebetween and said legs comprising a bend where an enlarged open area is provided between said legs for receiving the soldering joint, the maximum spacing between said legs in said enlarged area being between approximately 0.8 and 1.2 mm.

2. An unsoldering tip according to claim 1, wherein the enlargement is delimited by arcs of a circle.

3. An unsoldering tip according to claim 1, wherein the legs are bent for approximately 180° at the area of the bend.

4. An unsoldering tip according to claim 1, wherein said voltage source is a low voltage source.

5. An unsoldering tip for use in an electrical soldering iron apparatus for unsoldering joints and for removing solder from said joints, said tip comprising an electrical conductor having a pair of ends which are electrically connectable to an electrical voltage source and having a resistance which is sufficient to cause said conductor to be electrically heated to a temperature sufficient to melt said solder when said ends are interconnected to said voltage source and said voltage source is energized, said conductor comprising a pair of legs which extend in spaced relation from the respective ends thereof to a terminal facing portion of said tip, said legs defining said facing portion and extending therefrom generally back toward said ends thereof to define a substantially U-shaped portion of said tip wherein said legs are connected, said legs cooperating to define an enlarged open area therebetween in said facing portion where the spacing between said legs is greater than it is in other adjacent areas of said tip including said U-shaped portion, the spacing between said legs in said adjacent area including said U-shaped portion being between 0.1 and 0.3 mm.

6. In the unsoldering tip of claim 5, said legs being bent by a total angle of approximately 180° in said bent portion.

7. In the unsoldering tip of claim 5, said voltage source further characterized as a low voltage source.

8. In the unsoldering tip of claim 5, the portions of said legs which define said enlarged open area being of arcuate configuration.

9. In the unsoldering tip of claim 8, the maximum spacing between the portions of said legs which define said enlarged area being between 0.8 and 1.2 mm.

10. In the unsoldering tip of claim 5, the maximum spacing between the portions of said legs which define said enlarged area being between 0.8 and 1.2 mm.

* * * * *